Patented Nov. 20, 1934

1,981,152

UNITED STATES PATENT OFFICE 1,981,152

PRODUCTION OF COMPOUND MATERIALS

James Henry Rooney, Spondon, near Derby, England, assignor to Celanese Corporation of America, a corporation of Delaware No Drawing. Application June 18, 1929, Serial No. 371,953. In Great Britain July 6, 1928

14 Claims. (Cl. 49—81)

This invention relates primarily to a new or improved process for securing adhesion between cellulose derivatives or between cellulose derivatives and other materials, for example glass, gelatin etc.

While the new process is of value in securing adhesion between sheets, films and the like of cellulose derivatives and any other desired material, it is particularly applicable to the production of composite glass (so-called splinterless glass) in which sheets of glass are reinforced by means of cellulose derivatives and thereby rendered substantially non-splintering.

Considerable difficulties have in the past arisen in the production of such composite glass owing to difficulties in securing a firm adhesion of cellulose esters to the glass. Usually the sheets of cellulose acetate, cellulose nitrate or the like are treated with volatile solvents or mixtures of volatile non-solvents and volatile solvents for the cellulose derivative so as to make them adherent, but in general the use of such dipping baths is unsatisfactory in that the action is too violent and tends to produce an actual solution of the cellulose derivative with consequent loss in transparency upon evaporation of the solvent. Non-solvents used alone on the other hand, while free from this disadvantage, do not secure strong adhesion such as is essential in the manufacture of wind-screens and the like.

According to the present invention I secure adhesion between the glass or other material and the cellulose derivative by treating the cellulose derivative in sheet, film or other form with a medium comprising a non-solvent for the cellulose derivative and a plasticizer therefor. The term plasticizer is to be understood to mean relatively high boiling substances which are either solvents or solutes for the cellulose derivative.

For example a sheet of the cellulose derivative may be dipped in such a medium, placed while wet, or even while in the dipping bath itself, between two sheets of glass, suitably prepared if desired, and the whole thereafter placed in a press and subjected to heat and pressure.

For the purpose of the present invention any convenient cellulose derivative may be employed, for example cellulose nitrate, cellulose acetate, cellulose formate, cellulose propionate or cellulose butyrate or other cellulose esters, or mixed cellulose esters; methyl cellulose, ethyl cellulose or benzyl cellulose or other cellulose ethers or mixed cellulose ethers or mixed cellulose ester-ethers. The organic substitution derivative of cellulose, i. e. the organic acid esters and ethers of cellulose are particularly valuable in that as compared with cellulose nitrate, they are relatively much less liable to discolouration with time.

I find that cellulose ethers do not present the same difficulties in adhering to glass and a new feature of the present invention is their use broadly for the production of composite glass. The new dipping solutions according to the present invention are however of considerable assistance in securing adhesion between glass and cellulose ethers.

The invention will hereinafter be described more particularly with reference to cellulose acetate, since of the organic substitution derivatives of cellulose this is at present by far the most important commercially.

The non-solvent medium is preferably volatile and organic in character and moreover is preferably a liquid which will act as a swelling agent for the cellulose derivative either in the cold or better upon application of heat, for example upon the application of heat usually employed in pressing the sheets together in the manufacture of composite glass. For cellulose acetate, benzene and like hydrocarbons may be used, but alcohols for example methyl alcohol, ethyl alcohol, propyl alcohol or isopropyl alcohol, are of particular value. Ethyl alcohol in the form of methylated spirit is especially useful. As plasticizers for the cellulose derivatives I may use any suitable substances, for example aryl sulphonamides, or their alkyl derivatives, and more especially the sulphonamides and derivatives thereof referred to in prior U. S. Patents Nos. 1,353,384, 1,353,385, 1,501,206 and 1,454,961, for example the mono-methyl derivatives of the isomeric xylene sulphonamides; phosphoric esters of phenols, for example triphenyl or tricresyl phosphate; and organic acid esters such as those of phthalic acid, for example diethyl-phthalate. I prefer however to employ esters of lower fatty acids and particularly the glycerin and glycol esters thereof, for example tri-acetin or glycoldiacetate, or the ethers of glycols, for example the butyl ethers of ethylene glycol, or mixtures of these substances.

Suitable dipping baths are, for example:—

(1) a mixture of methylated spirit and triacetin in proportions varying from 5 parts of triacetin with 95 parts of methylated spirit to 85–90 parts of triacetin with 15–10 parts of methylated spirit. A preferred dipping bath consists of 10 parts of triacetin and 90 parts of methylated spirit.

(2) a mixture of the above dipping bath with glycol diacetate and/or mono-butyl ether of ethylene glycol, these substances or mixtures thereof being added in a proportion of 1 to 50 parts.

(3) a mixture of methyl and/or ethyl alcohol with the mono-butyl ether of ethylene glycol in proportions, for example, varying from 10 parts of the ether with 90 parts of the alcohol to 50 parts of the ether with 50 parts of the alcohol.

As stated above the glass may be prepared by any suitable method. It should first be thoroughly cleaned to remove any grease and may thereafter receive a coating to render it more adherent. For example it may be coated with gelatin, and preferably with hardened gelatin, by any suitable method, or it may be coated with a resin or gum, such as gum tragacanth, or it may be rendered adherent by treatment with a solution of celluloid or cellulose nitrate. I have found that plastics of cellulose acetate or other cellulose ester or ether prepared with the aid of the above mentioned glycerin esters of lower fatty acids, e. g. triacetin, are particularly valuable for the manufacture of the sheets, films etc. for use in composite glass and that a rather higher proportion of plasticizer than is usual in the manufacture of blocks, articles etc. is generally preferable.

The following example illustrates the method of using the dipping baths of the invention but is not to be regarded as in any way limiting the invention.

Example

Glass sheets are first cleaned by rubbing over with precipitated barium carbonate and ammonia, washing with hot water and drying. The cleaned glass may then be treated with a surface layer of gum tragacanth, though this is by no means essential. A sheet of cellulose acetate is dipped in a bath consisting of 90 parts of methylated spirit and 10 parts of triacetin and while still wet or while in the dipping bath placed between the two prepared glass sheets, the whole placed in a press, heated to a temperature of approximately 60° C. and subjected to a pressure of 500 lbs. per square inch for approximately 5 minutes, after which it is taken out and allowed to cool.

Any desired number of glass sheets may be formed into a composite sheet by similar interposition of a layer of cellulose derivative between adjacent pairs.

Composite glass manufactured according to the present invention may be treated to seal its edges, and for this purpose any suitable compositions may be employed, for example a solution of a cellulose derivative may be applied and the solvent allowed to evaporate.

A further feature, however, of the present invention consists in a sealing composition particularly applicable to sealing composite glass made from glass sheets and cellulose acetate or other cellulose derivatives and particularly the organic derivatives. According to this feature a solution of an acaroid resin is applied. The acaroid resins (known variously as acaroid resin, gum accroides, red gum, xanthorrhea gum or resin, all hereinafter included in the term acaroid resin) have remarkable properties in that they are perfectly miscible with the cellulose acetate or other cellulose derivatives, and hence are capable of yielding perfect sealing of the edges of the composite glass. In the acaroid resin composition for use according to the present invention may be incorporated a proportion of cellulose acetate or other cellulose derivative and a solvent therefor, and furthermore a proportion of a non-solvent medium for the cellulose derivative may be employed. A very suitable composition for the purpose of the present invention consists of 5 parts of cellulose acetate, 5 parts of acaroid resin and 30 parts of acetone, 10 parts of diacetone alcohol and 25 parts each of alcohol and benzene.

Such a composition may be applied to the edges of the composite glass when cold and after evaporation of the volatile solvent or solvents it leaves a hardened surface forming a perfect seal round the edges of the glass. To obtain a coloured edge effect, fillers comprising suitable pigments or colouring matters may be incorporated in the sealing composition. Furthermore Canada balsam and/or gold size and/or sodium or potassium silicate may be incorporated therein or such reagents may be applied to the edges of the composite glass after sealing.

Coloured composite materials may be manufactured by incorporating in or applying to the glass or other material or to the cellulose derivative any suitable pigments or colouring matters.

To produce colourless composite materials with the aid of cellulose derivatives, small amounts of dyestuffs or colouring matters of complementary tints to the natural colour of the cellulose derivative may be incorporated in the sheets, films or the like.

While the invention has been described above more particularly with reference to cellulose acetate it may be applied to secure adhesion to glass of any other cellulose derivatives, for example other organic substitution derivatives of cellulose, and may further be applied to secure adhesion between a cellulose derivative and any material other than glass.

What I claim and desire to secure by Letters Patents is:—

1. Process for securing adhesion between cellulose derivatives and other materials, comprising treating the cellulose derivative with a medium comprising a volatile non-solvent for the cellulose derivative and a plasticizer therefor and applying the treated cellulose derivative to the other material.

2. Process for the manufacture of composite glass, comprising treating sheets and the like containing a cellulose derivative with a medium comprising a volatile non-solvent for the cellulose derivative and a plasticizer therefor, applying thereto while wet sheets of glass and subjecting to heat and pressure.

3. Process for the manufacture of composite glass, comprising treating sheets and the like having a basis of cellulose acetate with a medium comprising a non-solvent for the cellulose acetate and a plasticizer therefor, applying thereto while wet sheets of glass and subjecting to heat and pressure.

4. Process for the manufacture of composite glass, comprising treating sheets and the like having a basis of cellulose acetate with a medium comprising a non-solvent swelling agent for the cellulose acetate and a plasticizer therefor, applying thereto while wet sheets of glass and subjecting to heat and pressure.

5. Process for the manufacture of composite glass, comprising treating sheets and the like having a basis of cellulose acetate with a medium comprising a lower alcohol and a plasticizer for the cellulose acetate applying thereto while wet sheets of glass and subjecting to heat and pressure.

6. Process for the manufacture of composite glass, comprising treating sheets and the like having a basis of cellulose acetate with a medium comprising methylated spirit and an ester or ether of a polyhydric alcohol, applying thereto while wet sheets of glass and subjected to heat and pressure.

7. Process for the manufacture of composite glass, comprising treating sheets and the like having a basis of cellulose acetate with a medium comprising methylated spirit and triacetin, applying thereto while wet sheets of glass and subjecting to heat and pressure.

8. Process for the manufacture of composite glass, comprising treating sheets and the like containing cellulose derivatives to secure adhesion between them and sheets of glass and finally sealing the edges with a solution containing an acaroid resin.

9. Process for the manufacture of composite glass, comprising treating sheets and the like containing cellulose derivatives to secure adhesion between them and sheets of glass and finally sealing the edges with a solution containing an acaroid resin and a cellulose derivative.

10. Process for the manufacture of composite glass, comprising treating sheets and the like containing cellulose derivatives to secure adhesion between them and sheets of glass and finally sealing the edges with a coloured solution containing an acaroid resin.

11. Process for the manufacture of composite glass, comprising treating sheets and the like having a basis of cellulose acetate with a medium comprising a non-solvent for the cellulose acetate and a plasticizer therefor, applying thereto while wet sheets of glass and subjecting to heat and pressure and finally sealing the edges with a solution containing an acaroid resin.

12. Process for the manufacture of composite glass, comprising treating sheets and the like having a basis of cellulose acetate with a medium comprising a non-solvent for the cellulose acetate and a plasticizer therefor, applying thereto while wet sheets of glass and subjecting to heat and pressure and finally sealing the edges with a solution containing an acaroid resin and cellulose acetate.

13. Composite glass, comprising a sheet having as basis an organic substitution derivative of cellulose firmly secured at each face to a sheet of glass and sealed at its edges with a composition comprising an acaroid resin.

14. Composite glass, comprising a sheet having as basis cellulose acetate firmly secured at each face to a sheet of glass and sealed at its edges with a composition comprising an acaroid resin.

JAMES HENRY ROONEY.